Patented Mar. 8, 1949

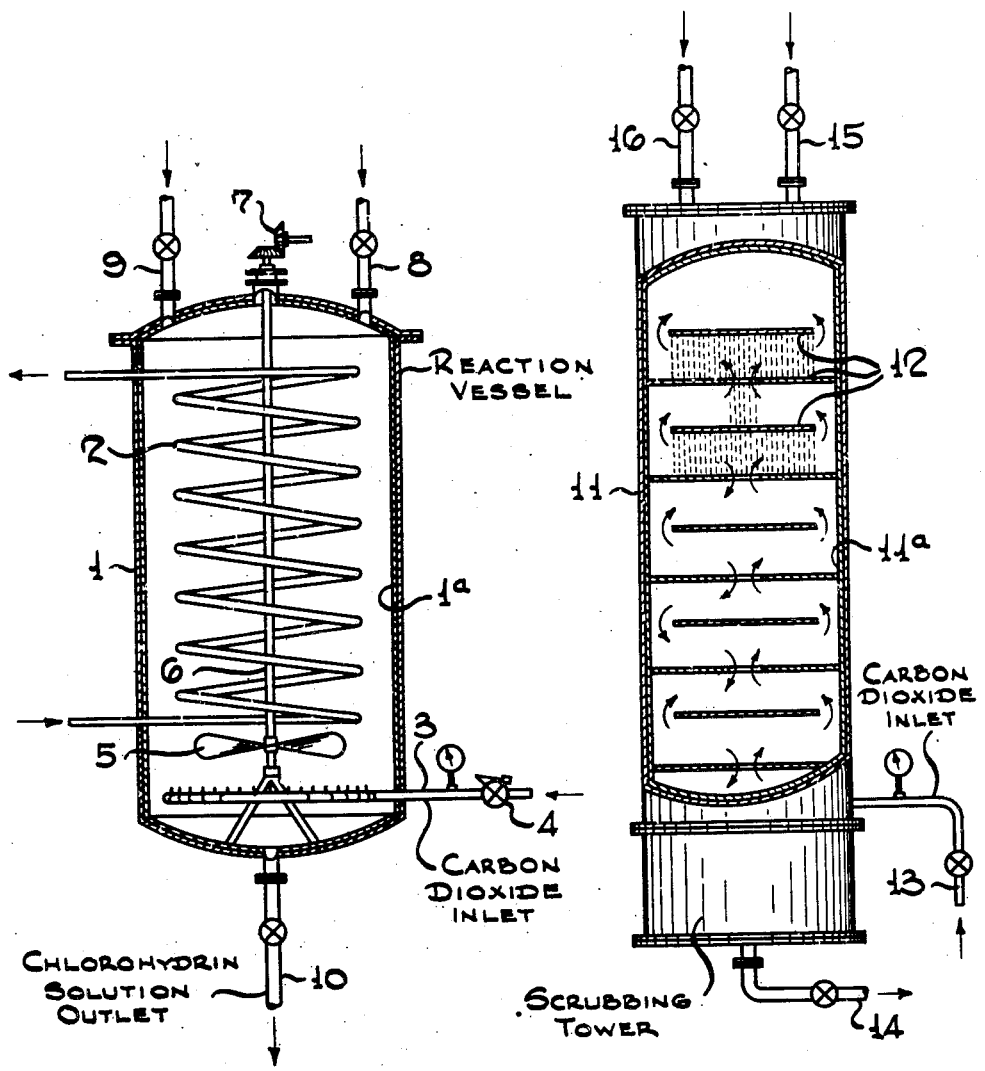

2,463,850

UNITED STATES PATENT OFFICE 2,463,850

PROCESS FOR THE PRODUCTION OF CHLOROHYDRINS

Benjamin T. Brooks, Old Greenwich, Conn., assignor to Standard Oil Development Company, a corporation of Delaware Application July 20, 1946, Serial No. 685,014

11 Claims. (Cl. 260—617)

The present invention relates to the production of chlorohydrins of unsaturated organic substances containing unsaturated carbon groups of the ethylene or olefinic type, and relates particularly to the addition of hypochlorous acid to liquid unsaturated hydrocarbons having four or more carbon atoms. The unsaturated hydrocarbons which are advantageously treated according to the present invention include butenes, amylenes, hexenes and the higher boiling olefins, such as decylenes, $C_{10}H_{20}$, dodecylenes, $C_{12}H_{24}$, cetene, and the like, which heretofore have not been successfully treated with hypochlorous acid to form chlorohydrins, also fractions or cuts of cracked gasoline, cracked kerosene and gas oil fractions, olefins derived from paraffin wax, and the like, or dienes, such as butadiene and isoprene, terpenes and unsaturated terpene derivatives and liquid fatty oils containing unsaturated groups as for example, olein and oils rich in olein, semidrying oils, such as corn oil, fish or menhaden oil and the more highly unsaturated fatty oils, such as linseed, tung or soy bean oils; also aromatic substances having unsaturated side chains such as styrene, allyl benzene and the like.

It is well known that the chlorohydrins of the simple olefins like ethylene and propylene, which are appreciably soluble in water, can be produced in good yields by passing these gaseous olefins into chlorine water, hypochlorous acid being formed by the reaction of chlorine and water, $Cl_2+H_2O=HOCl+HCl$. It is also well known that with these olefins the formation of dichlorides, by the direct combination of chlorine and the olefins, proceeds with increasing proportions of dichlorides as the concentration of chlorohydrins in the solution increases. The rate of the formation of ethylene and propylene chlorohydrins is also greatly reduced by the accumulation of free hydrochloric acid, or salt, in the chlorine water, so that it is not practically possible to build up more than about 10% of ethylene or propylene chlorohydrins in the reaction solution. The higher ethylene homologues, such as amylenes, hexenes and the like, react with chlorine much more readily than ethylene with the result that the chlorohydrins of these ethylene homologues have never successfully been prepared by the chlorine water method.

Heretofore, the chlorohydrins of liquid olefins such as pentenes have been made by treating the olefin with a solution of hypochlorous acid made by agitating chlorine water with mercuric oxide which yields dilute solutions of hypochlorous acid, substantially without free chlorine. However, this method of preparing substantially chlorine-free solutions of hypochlorous acid is costly and commercially impracticable since solutions of hypochlorous acid containing more than 1% or, at the most, 2% of hypochlorous acid are very unstable. It has also been proposed to liberate hypochlorous acid from hypochlorite solutions such as sodium hypochlorite, calcium hypochlorite, and bleaching powder solutions by adding excess chlorine or an acid, such as acetic acid, boric acid and carbon dioxide. However, although these methods are cheaper than the mercuric oxide method, such methods have not been applied commercially since hypochlorite solutions containing more than about 2% hypochlorite are notoriously unstable when the hypochlorous acid is liberated. The same limitation to dilute solutions applies to the well known method of passing chlorine into a solution of bicarbonate of soda.

It has also been proposed to pass a stream of gaseous olefins such as ethylene, propylene or oil gas, together with carbon dioxide, into a hypochlorite solution. This method also is limited in practice to hypochlorite solutions containing less than about 2% hypochlorite on account of the well known instability of the more concentrated hypochlorite solutions unless maintained on the strongly alkaline side. Thus, when carbon dioxide is passed into a concentrated hypochlorite solution, the alkali necessary for stability is neutralized and rapid decomposition of hypochlorite and hypochlorous acid to chlorine, oxygen and chlorate results before the added olefin can be reacted to form chlorohydrin to any satisfactory degree or with any efficient yield.

I find that most of the liquid olefins such as the butenes, pentenes, hexenes, styrene, terpenes, dienes, and the like, react with hypochlorous acid, relatively very slowly, so that to produce the chlorohydrins of such olefins successfully, the aqueous solutions containing the hypochlorous acid must be relatively stable. Solutions of hypochlorous acid or hypochlorites in a slightly acid condition and containing more than 1 to 2% of hypochlorite are well known for their instability and the decompositions which occur yield free oxygen, chlorate, HCl, and free chlorine. All of these decompositions result in loss of hypochlorite or hypochlorous acid and the formation of olefin dichlorides rather than olefin chlorohydrins.

An object of the present invention is to overcome the difficulties of using large volumes of aqueous hypochlorite or hypochlorous acid of low concentrations, such as 1 to 2%, and a further object of the invention is continuously to liberate hypochlorous acid in a mixture of water and a liquid olefinic substance under conditions such that substantially no decomposition of the hypochlorite or hypochlorous acid to chlorine, HCl, oxygen, or chlorate, takes place.

The process of the present invention consists, essentially, in charging an apparatus containing a vigorously agitated emulsion of water and a liquid olefinic material with carbon dioxide, and adding thereto a concentrated alkaline hypochlorite solution in small increments while maintaining an excess of carbon dioxide in the solution and in the apparatus. In this way a strongly alkaline stable and concentrated hypochlorite solution is employed, having a pH of say about 12, and which is diluted on coming into the aqueous emulsion and where free hypochlorous acid is liberated by carbon dioxide, the pH of the aqueous phase of the emulsion being maintained at the pH of aqueous carbon dioxide, or about 6.5. The reaction mixture is cooled to prevent rise in temperature, the reaction being preferably carried out at temperatures within the range 0 to 30° C. Under these conditions, substantially no decomposition of the hypochlorous acid or hypochlorite to chlorine, HCl, oxygen or chlorate takes place. The rate of adding the concentrated hypochlorite solution and carbon dioxide to the aqueous emulsion of oil and hypochlorous acid solution is regulated to conform to the rate at which the olefinic unsaturated material reacts with the hypochlorous acid to form chlorohydrins, so as to maintain a concentration of hypochlorous acid at about 1% or less. In order to insure an excess of carbon dioxide in the reaction zone and particularly in the aqueous phase, vigorous agitation is necessary to emulsify the olefinic liquid material and provide direct contact between the carbon dioxide and the aqueous phase, and it is advantageous also, for the same reason, to employ the carbon dioxide under moderate pressures of about 5 to 50 pounds per square inch. It is also highly advantageous to maintain the liquid olefinic material in excess while the hypochlorous acid is being liberated, promoting the intimate contact of the aqueous and oil phases by vigorous agitation and thus by continuous reaction of hypochlorous acid and olefin, maintain low concentrations of hypochlorous acid in the aqueous phase.

The common commercial hypochlorites may be employed in carrying out the process of the present invention, and may be employed in a concentrated state, the hypochlorite solutions being added to the aqueous emulsion in small increments as already set forth. Thus, sodium hypochlorite solutions containing 10 to 15% NaOCl, bleaching powder solutions, containing 10 to 20% commercial bleaching powder or calcium hypochlorite or its compound with free lime, now available commercially, may also be employed, preferably in solutions of 10 to 15%, but in using such hypochlorite solutions, it is, of course, necessary to use them in a strongly alkaline condition until introduced in small increments into the reaction zone where the hypochlorous acid is liberated.

When sodium hypochlorite is used, the excess alkali and the sodium hypochlorite is converted into sodium bicarbonate and free hypochlorous acid. When bleaching powder or calcium hypochlorite is employed the free lime present and the calcium present as hypochlorite is precipitated as calcium carbonate and, to this extent, avoids building up a high concentration of soluble salts in the aqueous solution. Accordingly since the accumulation of soluble salts interferes with the formation of chlorohydrins, the preferred hypochlorite employed is calcium hypochlorite which, in commercial form, is stabilized by free lime, calcium hydroxide. With this material, substantially all of the calcium is precipitated as calcium carbonate. Accordingly, when bleaching powder or calcium hypochlorite is employed, the precipitated calcium carbonate may be removed by means of a filter press or filtering with suction and the chlorohydrin separated from the water layer as an insoluble or sparingly soluble oil. The chlorohydrin can also be recovered from the reaction mixture by dissolving the precipitated calcium carbonate by adding hydrochloric acid. This latter procedure is the preferred one in cases where the chlorohydrin produced is a crystalline solid as is the case with turpentine or pinene.

The process of this invention may be readily understood by comparison of the accompanying drawings. Fig. 1 shows a vessel adapted to the operation of this invention as a batch process. Fig. 2 illustrates the arrangement applicable to a continuous process.

Referring to Fig. 1, numeral 1 represents a closed reaction vessel constructed of steel and lined with an inert material 1a, so as to withstand corrosion and prevent contamination of the reaction solution by metals such as iron and nickel which catalyze the decomposition of hypochlorous acid solutions. For this purpose the vessel should be lined with lead, silver, rubber, glass enamel, ceramic material, or other inert protective coating. 2 represents a cooling coil thru which brine or other cooling liquid is circulated. Instead of a cooling coil, a cooling jacket could entirely surround the reaction vessel 1. Carbon dioxide enters the reaction vessel thru pipe 3 equipped with a pressure regulator 4 whereby the pressure of carbon dioxide within the reaction vessel is maintained at between 5 and 50 lbs./sq. in. gauge. The vessel is equipped with a stirrer 5 attached thru rod 6 to and impelled by an outside source of power 7. The vessel is charged with unsaturated material and water thru inlet 8 and a controlled amount of a solution of a salt of hypochlorous acid is introduced into the vessel 1 thru inlet 9. The chlorohydrin solution is withdrawn thru pipe 10.

Fig. 2 shows a scrubbing tower 11 having a lining 11a and equipped with plates 12, both of which are constructed of materials similar to those used in the construction of the reaction chamber 1, Fig. 1. Carbon dioxide gas enters the scrubbing tower thru pipe 13 where it passes upwardly in countercurrent flow to the descending reaction mixture. The products of the reaction are drawn off thru pipe 14. A mixture of unsaturated material and water enters the top of the scrubbing tower thru pipe 15 and a controlled amount of a solution of a hypochlorite is introduced into the tower thru pipe 16. A cooling coil (not shown) by means of which the temperature within the tower may be controlled is optional equipment; otherwise the products may be removed and fresh unsaturated material and water added at a sufficiently rapid rate to maintain the desired temperature.

Very dilute solutions of hypochlorite may be supplied to the apparatus containing carbon dioxide and unsaturated olefinic substance but I prefer to start the process with a substantial proportion of pure water, and the material to be treated, in the reaction vessel and slowly add a moderately concentrated hypochlorite solution. The hypochlorite used in this way may be any convenient concentration up to about 25% and is made up to be alkaline and stable before passing into the water and carbon dioxide in the reaction vessel.

When the unsaturated olefinic material is a solid at the temperatures employed, as, for example, cetene, the material may be dissolved in a suitable inert solvent, such as straight run petroleum ether, naphtha, gasoline, carbon tetrachloride, or the like. Cracked gasoline fractions containing both unsaturated and saturated hydrocarbons may successfully be treated by the process of the present invention for the production of the chlorohydrins of the unsaturated hydrocarbons present. It has been found that the chlorohydrins of the hydrocarbons of more than 5 carbon atoms cannot be distilled at atmospheric pressure without decomposition but can usually be distilled successfully at reduced pressures. When it is desired to separate the chlorohydrins from the associated saturated hydrocarbons, the crude product is subjected to distillation at reduced pressures, preferably below 30 mm. Under these conditions, the saturated hydrocarbons can be removed, leaving the chlorohydrins as undistilled residues, and in many cases the chlorohydrins themselves can be distilled in vacuo, if desired, separating them by their higher boiling points. In many cases, however, the mixture of saturated hydrocarbons and chlorohydrins can be used directly for the conversion of the latter to other substances, such as epoxide, oxy-amines and the like. When the chlorohydrins are to be separated by distillation in vacuo, it is necessary to employ close cut fractions of the cracked gasoline. Thus the cracked gasoline fraction containing heptenes and octenes yields chlorohydrins, distilling, with decomposition, at temperatures above 200° C. but the saturated hydrocarbons in the original fraction distill under atmospheric pressure at approximately within the range 100°–130° C. and are accordingly easily removed by distillation under moderate vacuum at temperatures which cause no decomposition of the desired chlorohydrins.

The process of the present invention is illustrated by the following examples:

*Example 1*

130 parts by weight of allyl chloride and 800 parts by weight of water were charged into an apparatus which was cooled by cold water and provided with an agitator, an inlet for carbon dioxide gas, and an inlet for hypochlorite solution. The apparatus was charged with carbon dioxide under 5 to 10 lbs. pressure, the agitator started and a slow stream of hypochlorite solution containing 165 parts by weight of commercial calcium hypochlorite in 400 parts of water was introduced. The calcium hypochlorite used contained 70% of available chlorine. The temperature of the reaction mixture was maintained below 20° C. The precipitated calcium carbonate assisted materially in keeping the liquid allyl chloride and the aqueous solution thoroughly emulsified. There was obtained 163 parts of the glycerine dichlorhydrin, $C_3H_6OCl_2$.

*Example 2*

110 parts by weight of pentene-2 and 600 parts by weight of water were chilled with ice water, and 100 parts by weight of commercial calcium hypochlorite (70% available chlorine) dissolved in 600 parts of water were slowly introduced, maintaining a pressure of about 5 lbs. of carbon dioxide in the reaction vessel. The reaction mixture was vigorously agitated. There were recovered 10 parts of unchanged pentene-2 and 155 parts of chlorohydrin of pentene.

*Example 3*

200 parts by weight of the hexene, 2-methyl pentene-2 ($CH_3CH_2CH=C(CH_3)_2$) were treated with 1000 parts by weight of water, and while continuously passing carbon dioxide into the mixture, 230 parts by weight of calcium hypochlorite (70% available chlorine) in 800 parts of water were slowly added during a period of 2½ hours. The temperature of the reaction mixture was kept below 20° C. by cooling with ice water. A slight pressure of excess carbon dioxide was maintained in the reaction vessel. The aqueous solution and oil were kept vigorously agitated. There were obtained 301 parts of crude chlorohydrin, which yielded 15 parts of unchanged hydrocarbon which could be recycled to the reactor. The yield of chlorohydrin, boiling point 143°–145° C., was 88%. The chemical character of the chlorohydrin was shown by treating it with solid caustic soda, the mixture becoming heated with separation of sodium chloride. The oxide, a yield of 85% of the theoretical being obtained, showed a boiling point of 97°–98° C. This oxide was made by Henry (Comptus Rendue 144 1405 (1907)); dilute sulfuric acid readily hydrates the oxide to the glycol

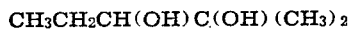
$$CH_3CH_2CH(OH)C(OH)(CH_3)_2$$

*Example 4*

165 parts of cyclohexene, $C_6H_{10}$ were treated with 1000 parts of water and 200 parts of calcium hypochlorite (70% available chlorine) in 1000 parts of water, all parts by weight, were slowly added while maintaining excess carbon dioxide in the vigorously agitated reaction mixture. The reaction mixture was kept cool, below 20° C. by a cooling bath of ice water. When all the hypochlorite had been added, during a period of about 3 hours, the precipitated calcium carbonate was filtered with suction and the oily cyclohexane chlorohydrin (2-chloro cyclohexanol-1) separated from the aqueous solution. The chlorohydrin is sparingly soluble in water, and by extraction of the aqueous solution by an immiscible solvent a further quantity of the chlorohydrin was recovered. The chlorohydrin was dried and distilled in vacuo, boiling point 77°–78° C. at 10 mms. The yield of crude chlorohydrins, after drying, was 263 parts by weight, or about 98% of the theoretical possible yield. The character of the chlorohydrin was further shown by converting it to the cyclohexane oxide $C_6H_{10}O$, boiling point 129°–131° C. From 410 parts of the chlorhydrin there were obtained 294 parts of the oxide, or 98% of the theoretical.

*Example 5*

212 parts of cetene $C_{16}H_{32}$, were treated with 51 parts of hypochlorous acid, liberated from calcium hypochlorite by carbon dioxide as described in Examples 1 and 2. The crude chlorohydrin showed a chlorine content of 11.4% and was purified by vacuum distillation, obtaining 11 parts of unchanged cetene and 244 parts of cetene chlorohydrin distilling at 164°–165° C. at 4 mm.

The preceding disclosure and examples are given for the purpose of illustration only and are not to be considered as any way limiting the invention.

*Example 6*

200 grams of trimethylethylene and 1 liter of water were vigorously agitated in a closed apparatus in an atmosphere of carbon dioxide under 5 lbs. per square inch pressure while 250 grams of commercial calcium hypochlorite, dissolved in 2 liters of water, all parts by weight, were gradually added in small increments during a period of two hours, the temperature being maintained at about 20°. After filtering off the precipitated calcium carbonate, a total of 326 grams of chlorohydrins was recovered from the aqueous solution.

*Example 7*

330 grams of pinene, boiling point 155–157° C., obtained by distillation of commercial turpentine, and 1 liter of water was treated as in Example 6 with 240 grams of commercial calcium hypochlorite dissolved in 2 liters of water, during a period of 2 hours, maintaining a temperature of about 20° C. The product consisted of 443 grams of an oil insoluble in water and consisting of pinene mono-chlorohydrin and 20 grams of a crystalline product which, upon analysis, proved to be the dichlorhydrin of pinene.

For the purposes of comparing the results obtained by contacting olefinic material with hypochlorous acid as rapidly as possible, runs were made in which first, the reactor was charged with aqueous calcium hypochlorite, pressured with $CO_2$, after which the olefinic material also added rapidly as possible, and second, the reactor was charged with olefin and water, pressured with $CO_2$ and then an aqueous solution of calcium hypochlorite added with the following results:

*Example 8*

A glass reaction flask equipped with an efficient stirrer was charged with 1200 cc. of water and 100 g. of calcium hypochlorite (Mathieson HTH) which was shown by titration to contain the equivalent of one mol of chlorine. The reactor was then pressured to about 800 mm. of Hg with $CO_2$. Pentene-2 (100 g.) was added to the reactor during a period of 20 minutes while maintaining the pressure of $CO_2$, which was rapidly absorbed, at 800 mm. and keeping the reaction mixture at a temperature of 10–15° C. by external cooling. The yield of chlorohydrin obtained was 79% of the theoretic based on the quantity of calcium hypochlorite employed. After purification, the yield was 47% of chlorohydrin.

*Example 9*

The same apparatus and operating conditions described in Example 8 was used in this experiment except the reactor was charged with 100 g. of pentene-2 and 600 cc. of water. The reactor was then pressured as before with $CO_2$ and 100 g. of calcium hypochlorite dissolved in 600 cc. of water was added to the flask during 20 minutes. The yields of crude chlorohydrin from this experiment based upon the quantity of calcium hypochlorite used was 82.5% of the theoretic. After purification, the yield was 61%.

What is claimed is:

1. A process for the production of chlorohydrins from liquid olefin hydrocarbons which comprises first admixing the liquid olefin hydrocarbon, water and carbon dioxide to form an aqueous emulsion thereof, thereafter slowly adding an aqueous solution of alkali hypochlorite to said emulsion, regulating the addition of the hypochlorite solution so as to maintain hypochlorous acid of less than 1% concentration in the aqueous phase of the emulsion while the olefin is reacted with the hypochlorous acid as it is formed by the action of the carbon dioxide in said aqueous phase on the aqueous alkali hypochlorite, maintaining an excess of carbon dioxide in the emulsion by separately adding carbon dioxide to the emulsion during the reaction, and recovering chlorohydrin from the reaction mass.

2. The process according to claim 1 in which the olefinic hydrocarbon is a hydrocarbon possessing more than three carbon atoms.

3. The process according to claim 1 in which the aqueous hypochlorite solution which is added to the emulsion of water and hydrocarbon contains more than 5% of hypochlorite.

4. A process according to claim 1 in which the temperature of the reaction is maintained between 0° and 30° C.

5. A process according to claim 1 in which the olefinic hydrocarbon is a diene.

6. The process according to claim 1 in which the olefinic hydrocarbon is a terpene.

7. The process according to claim 1 in which the olefinic hydrocarbon is a cracked gasoline fraction containing olefinic and saturated hydrocarbons.

8. The process according to claim 1 in which the olefinic hydrocarbon is an aromatic hydrocarbon with an olefinic side chain.

9. The process according to claim 1 in which the carbon dioxide in the reaction zone is maintained under a pressure of 5 to 50 pounds gauge pressure.

10. The process according to claim 1 in which the olefin contains four to eight carbon atoms to the molecule.

11. A process according to claim 1 in which the reaction is carried out in the presence of a molecular excess of the liquid olefin hydrocarbon over the hypochlorous acid.

BENJAMIN T. BROOKS.

REFERENCES CITED

The following references are of record in the file of this patent:

UNITED STATES PATENTS

| Number | Name | Date |
|---|---|---|
| 1,308,796 | McElroy | July 8, 1919 |
| 1,465,595 | Brooks | Aug. 21, 1923 |
| 1,496,675 | Irvine et al. | June 3, 1924 |
| 1,498,782 | Brooks | June 24, 1924 |
| 1,510,790 | McElroy | Oct. 7, 1924 |
| 1,904,677 | Cook | Apr. 18, 1933 |

FOREIGN PATENTS

| Number | Country | Date |
|---|---|---|
| 235,044 | Great Britain | June 11, 1925 |
| 301,905 | Germany | Nov. 10, 1917 |

OTHER REFERENCES

Gomberg, "Jour. Am. Chem. Soc.," vol. 41, pages 1414–1419 (1919).